United States Patent
Masuda et al.

(10) Patent No.: US 7,809,402 B2
(45) Date of Patent: Oct. 5, 2010

(54) COMMUNICATION TERMINAL, COMMUNICATION SYSTEM, AND CONTROL METHOD

(75) Inventors: Kyoko Masuda, Kawasaki (JP); Aki Ohashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 576 days.

(21) Appl. No.: 11/695,806

(22) Filed: Apr. 3, 2007

(65) Prior Publication Data
US 2008/0014993 A1 Jan. 17, 2008

(30) Foreign Application Priority Data
Apr. 6, 2006 (JP) ............................ P2006-105409

(51) Int. Cl.
*H04M 1/00* (2006.01)
(52) U.S. Cl. ..................... 455/556.1; 455/426; 455/566
(58) Field of Classification Search ................. 455/566, 455/414.1, 95, 415, 405, 406, 411
See application file for complete search history.

(56) References Cited

U.S. PATENT DOCUMENTS
6,239,787 B1 * 5/2001 Sugaya ........................ 345/169

FOREIGN PATENT DOCUMENTS

| | | |
|---|---|---|
| CN | 1136756 A | 11/1996 |
| EP | 0 715 442 A2 | 6/1996 |
| EP | 0 825 751 A2 | 2/1998 |
| EP | 0 941 009 A2 | 9/1999 |
| EP | 1 282 319 A2 | 2/2003 |
| JP | 10-98544 | 4/1998 |
| JP | 10-257197 | 9/1998 |
| JP | 11-298966 | 10/1999 |
| JP | 2000-514616 | 10/2000 |
| JP | 2001-186240 | 7/2001 |
| JP | 2002-9930 | 1/2002 |
| JP | 2003-78592 | 3/2003 |

* cited by examiner

*Primary Examiner*—Yuwen Pan
*Assistant Examiner*—Ajibola Akinyemi
(74) *Attorney, Agent, or Firm*—Oblon, Spivak, McClelland, Maier & Neustadt, L.L.P.

(57) ABSTRACT

It is an object of the present invention to improve the convenience for users by enabling messages during call out from the user of the communication terminal on the outgoing side to the user of a communication terminal on the incoming side, which are transmitted from the communication terminal on the outgoing side, to be checked by the user of the communication terminal on the outgoing side when calling out. The outgoing terminal 10a includes a display device 11, a call connection establishment unit 12 that transmits call out signals for calling out to the incoming terminal 10b, a transmitted information setting and adding unit 13 that adds display information that is displayed in the incoming terminal 10b to the call out signal, and a display control unit 14 that displays on the display device 11 the display information added to the call out signal when the call out signal is transmitted.

6 Claims, 4 Drawing Sheets

COMMUNICATION TERMINAL, COMMUNICATION SYSTEM, AND CONTROL METHOD

BACKGROUND OF THE INVENTION

1. Field of the Invention

The present invention relates to a communication terminal and communication system, and a control method for the communication terminal and communication system.

2. Related Background of the Invention

Conventionally, in communications systems for mobile phones and the like, technology has been invented so that when calling out display data such as text data or similar is added to the call out signal, and this display data is displayed by the receiving terminal that receives the call out signal. This content is for example, as disclosed in Japanese Patent Application Laid-open No. 2003-78592. In this way, the user of the communication terminal on the incoming side can receive a simple message from the user on the outgoing side, before the connection is established.

SUMMARY OF THE INVENTION

However, in the above system, it is not possible for the user of the communication terminal on the outgoing side to check what display data is displayed in the communication terminal on the incoming side, when the outgoing process is being carried out.

The present invention solves this problem point. It is an object of the present invention to provide a communication terminal, communication system, and control method in which a message transmitted from a communication terminal on the outgoing side by the user of the communication terminal on the outgoing side to the user of a communication terminal on the incoming side when calling out can be checked by the user of the communication terminal on the outgoing side when calling out, thereby improving the convenience for the user.

The communication terminal according to the present invention is a communication terminal having a display device, comprising: transmission means for transmitting a call out signal for calling out to a communication terminal of a communication party; adding means for adding display information, that is displayed in the communication terminal of the communication party, to the call out signal transmitted by the transmission means; and display control means for displaying the display information added to the call out signal by the adding means on the display device, when the call out signal is transmitted by the transmission means.

In the communication terminal according to the present invention, when the call out signal is transmitted, the display information displayed in the communication terminal of the communication party is also displayed in its own terminal. The user of the communication terminal according to the present invention can confirm the message (display information) transmitted from its own terminal (the outgoing side communication terminal) to the user of the incoming side communication terminal when calling out, by referring to the display of the communication terminal according to the present invention. In this way, according to the communication terminal of the present invention, a user can confirm what message has been transmitted to the communication party while calling out, so the convenience of the user can be improved.

Preferably the communication terminal further comprises receiving means for receiving a transmission notification transmitted from the communication terminal of the communication party in accordance with the call out signal transmitted by the transmission means, the transmission notification indicating that the communication terminal of the communication party has received the display information added to the call out signal. With this configuration, termination of the display of the display information in its own terminal can be carried out at a suitable timing in terms of the use of the communication terminal by the user. Also, the user of the communication terminal on the outgoing side can confirm whether the display information has been displayed in the communication terminal on the incoming side. Therefore, according to this configuration the convenience of the user can be improved.

Preferably the communication system for communicating with the communication terminal of the communication party is a third generation mobile communication system, and the adding means adds the display information to the call out signal by including the display information in a locking shift codeset of the call out signal. According to this configuration, the present invention can be simply and reliably implemented in a third generation mobile communication system.

The communication system according to the present invention is a communication system that includes a plurality of communication terminals each having a display device, and a charge information generation device that generates charging information for charging the transmission by the communication terminals, wherein the communication terminal comprises: transmission means for transmitting a call out signal for calling out to a communication terminal of a communication party; adding means for adding display information, that is displayed in the communication terminal of the communication party, to the call out signal transmitted by the transmission means; display control means for displaying the display information added to the call out signal by the adding means on the display device, when the call out signal is transmitted by the transmission means; and receiving means for receiving a transmission notification transmitted from the communication terminal of the communication party in accordance with the call out signal transmitted by the transmission means, the transmission notification indicating that the communication terminal of the communication party has received the display information added to the call out signal, and the charge information generation device detects the transmission of the transmission notification to the communication terminal, and generates charging information on the transmission of the display information. In the communication system according to the present invention, in a communication terminal, when a call out signal is transmitted, the display information displayed in the communication terminal of the communication party is also displayed in one's own device, and charging information associated with the transmission of the display information is generated. In this way, according to the communication system of the present invention, the convenience of the user can be improved, and in addition control of the charging associated with the transmission of the display information is simplified.

Besides being described as a communication terminal or a communication system as above, the present invention may also be described as a control method for a communication terminal or a communication system as described below. This differs only in category, but the invention is substantially the same, so the operation and effect is the same.

A control method according to the present invention is a control method for a communication terminal having a display device, comprising: a transmitting step of transmitting a call out signal for calling out to a communication terminal of a communication party; an adding step of adding display information that is displayed in the communication terminal of the communication party to the call out signal transmitted in the transmitting step; and a display control step of displaying on the display device the display information added to the call out signal in the adding step, when the call out signal is transmitted in the transmitting step.

A control method according to the present invention is a control method in a communication system that includes a plurality of communication terminals each having a display device, and a charge information generation device that generates charging information for charging the transmission by the communication terminals, wherein the communication terminals carry out: a transmitting step of transmitting a call out signal for calling out to a communication terminal of a communication party; an adding step of adding display information that is displayed in the communication terminal of the communication party to the call out signal transmitted in the transmitting step; a display control step of displaying on the display device the display information added to the call out signal in the adding step, when the call out signal is transmitted in the transmitting step; and a receiving step of receiving a transmission notification transmitted from the communication terminal of the communication party in accordance with the call out signal transmitted in the transmitting step, the transmission notification indicating that the communication terminal of the communication party has received the display information added to the call out signal, and the charge information generation device carries out: a charge information generating step of generating charging information on the transmission of the display information by detecting the transmission of the transmission notification to the communication terminal.

In the present invention, when the call out signal is transmitted, the display information displayed in the communication terminal of the communication party is also displayed in its own terminal. The user can confirm the message (display information) transmitted from its own terminal (the outgoing side communication terminal) to the user of the incoming side communication terminal when calling out, by referring to the display. In this way, according to the present invention, a user can confirm what message has been transmitted to the communication party while calling out, so the convenience of the user can be improved.

Figure 1:
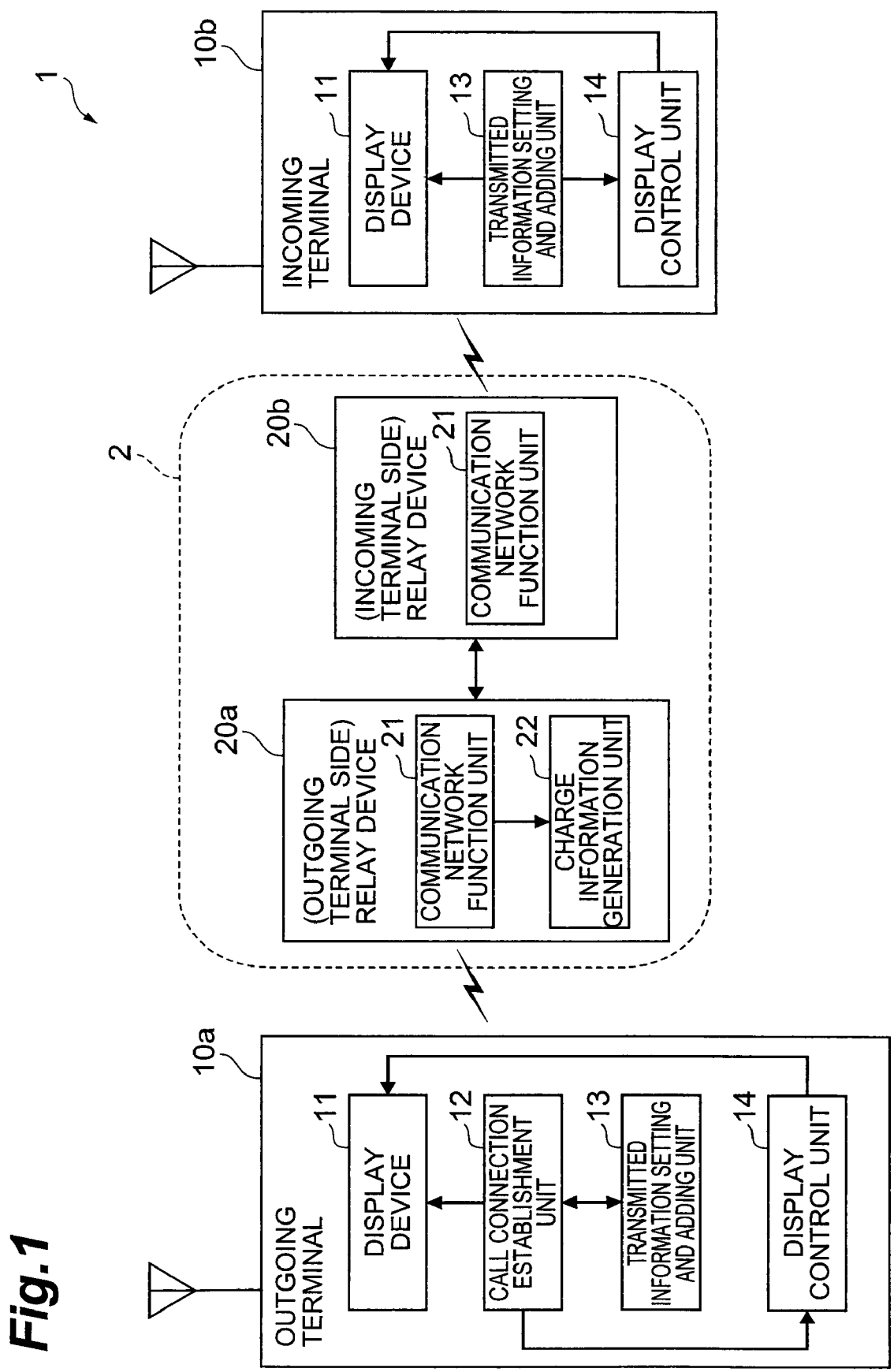
FIG. 1 is a diagram showing the configuration of the communication terminal and communication system according to an embodiment of the present invention.

DESCRIPTION OF THE PREFERRED
EMBODIMENTS

The following is a detailed explanation together with the drawings of the preferred embodiments of the communication terminal, communication system, and control method according to the present invention. In the explanation of the drawings, the same element is given the same reference numeral, and duplication of explanations is omitted.

FIG. 1 shows the configuration of a communication terminal 10 (general term for a communication terminal 10a, 10b), and a communication system 1 that includes a plurality of communication terminals 10. The communication system 1 includes a communication network 2 in addition to the communication terminals 10. The communication network 2 includes a plurality of relay devices (LMMS) 20 (a general term for relay device 20a, 20b). In the present embodiment, the communication terminals 10 are mobile phones capable of mobile communication, and the communication network 2 is a mobile communication network. In other words, the communication system 1 is a mobile communication system. Each communication terminal 10 is used by its respective user, and users can converse with each other by connecting with another communication terminal 10 via the communication network 2. FIG. 1 only shows two communication terminals 10, but the communication system 1 includes many communication terminals 10. In the present embodiment, the communication terminal 10a is taken to be the terminal on the outgoing side (outgoing terminal), and the communication terminal 10b is taken to be the terminal on the incoming side (incoming terminal).

The outgoing terminal 10a can include display information in the transmitted call out signal when calling and connecting. The display information is displayed in the incoming terminal 10b that receives the call out signal. The display information is explained in more detail later.

The communication terminal 10 specifically includes a central processing unit (CPU), a memory, an antenna, and other mobile communication modules. As a result of the operation of these modules the communication terminal has each of the functions explained below. As shown in FIG. 1, the communication terminal 10 includes a display device 11, a call connection establishment unit 12, a transmitted information setting and adding unit 13, and a display control unit 14. In the communication terminal 10b, the transmitted information setting and adding unit 13 is not necessarily provided in the communication terminal 10. Also, in addition the communication terminal 10 has various means for achieving the function as a mobile phone, but explanation of these functions is omitted.

The display device 11 is a device that displays information regarding communication and the like in the communication terminal 10. The display device 11 is realized using for example a liquid crystal display or similar. The display device 11 is controlled by the display control unit 14 or similar. Also, the information displayed on the display device 11 is transmitted from the display control unit 14 and other constituent elements.

The call connection establishment unit 12 is a part that undertakes the function of calling and establishing a connection for communication. Specifically, the call connection establishment unit 12 includes a function as a transmission means for transmitting a call out signal for calling out to the communication terminal 10 of the communication party. Also, the call connection establishment unit 12 includes a function as call connection establishment means for establishing call connections, that receives call out signals transmitted to its own terminal 10 by another communication terminal 10. Also, the call connection establishment unit 12 includes a function as receiving means for receiving transmission notifications transmitted from the communication terminal 10 of the communication party, in response to call out signals transmitted from its own terminal 10. The transmission notifications indicate that display information included with the call out signals have been received by the communication terminal 10 of the communication party.

The call out signal is transmitted from the outgoing terminal 10*a* to the incoming terminal 10*b* when a call is requested (by the operation of the user, or similar), as stated above. The call out signal includes information on the telephone numbers of the outgoing terminal 10*a* and the incoming terminal 10*b* (information to specify the outgoing terminal 10*a* and the incoming terminal 10*b*).

The transmitted information setting and adding unit 13 is adding means for adding display information that is displayed in the communication terminal 10 of the communication party to the call out signal transmitted by the call connection establishment unit 12. The display information is used for the user of the outgoing terminal 10*a* to notify the user of the incoming terminal 10*b* of the purpose of the call, or for the transmitter to inform the receiver of who the transmitter is, and so on. In other words, the display information is used when the user of the outgoing terminal 10*a* wants to transmit any kind of message to the user of the incoming terminal 10*b* when making the call. The user of the incoming terminal 10*b* can decide whether to answer the call by referring to the display information displayed in the incoming terminal 10*b*.

Specifically, the display information corresponds to, for example, text data with a determined number of characters. At this time, the maximum number of characters in the text data may be set to, for example, 10 characters, in accordance with the specification for the field in which the display information is included in the call out signal, the communication terminal 10, the communication system 1, and so on. In this case, the information is stored in advance in the transmitted information setting and adding unit 13.

If the communication system 1 is a third generation mobile communication system, the transmitted information setting and adding unit 13 preferably adds the display information to the call out signal by including the display information in the locking shift codeset 7 of the call out signal. The locking shift codeset is specified as a field in the call out signal in the standard for third generation mobile communication systems. In the standard for third generation mobile communication systems, there is no requirement regarding how the locking shift codeset is used, so in the present embodiment display information is included in the locking shift codeset.

In third generation mobile communication systems, the display information may also be included in the facility in the call out signal. However, compared with an information length of 30 octets in the facility, the locking shift codeset has a maximum of 255 octets. Therefore the capacity for future expansion is superior in the locking shift codeset, and it can be freely used by the operator. From this point of view therefore, it is preferable to use the locking shift codeset as the field to include the display information in the call out signal.

Also, the transmitted information setting and adding unit 13 has setting means for setting what kind of display information to add to the call out signal for transmission. Setting the display information is carried out in advance by input from the user, or similar. The display information may also be input by the user when calling out. A plurality of candidate display information for addition to a call out signal may be registered in advance in the transmitted information setting and adding unit 13, from which the user can select. In this case, the number of candidate display information items that can be registered in advance may be 10 or more. Transmission information set in this way is added to the call out signal by the transmitted information setting and adding unit 13 when calling out.

The display control unit 14 is a part that undertakes the function of transmitting information to be displayed on the display device 11, and controlling the display. Specifically, the display control unit 14 includes a function as display control means for displaying on the display device 11 (of its own terminal 10) the display information included in the call out signal by the transmitted information setting and adding unit 13, when a call out signal is transmitted by the call connection establishment unit 12 of its own terminal 10. The display control unit 14 detects the transmission of call out signals, by receiving notifications that a call out signal has been transmitted by the call connection establishment unit 12. Also, display control is carried out by receiving display information from the call connection establishment unit 12, and transmitting the display information to the display device 11. Also, the display control unit 14 carries out control to terminate the display of the display information in the call out signal when a transmission notification is received from the call connection establishment unit 12. Also, the display control unit 14 performs display on the display device 11 in accordance with the transmission notifications. This control is also carried out in the same way as control of the above display.

Further, the display control unit 14 includes a function as display control means for reading display information from a call out signal received by the call connection establishment unit 12 (transmitted from another communication terminal 10) and displaying on the display device 11 (of its own terminal 10) the display information that has been read. This display control is also carried out in the same way as control of the above display.

The above is an explanation of the configuration of each function of the communication terminal 10. Next, the relay device 20 is explained. A plurality of relay devices 20 are mutually connected to form the communication network 2. Each individual relay device 20 includes equipment for circuit control, and so on. Also, the relay device 20 includes a charge information generation device that generates charging information for the communication charges of the communication terminal 10. In FIG. 1 only two relay devices 20 are shown, but normally the communication network 2 includes many relay devices 20. Here, the relay device 20*a* is taken to be the relay device 20 in the communication network 2 near the outgoing terminal 10*a*, and the relay device 20*b* is taken to be the relay device 20 in the communication network 2 near the incoming terminal 10*b*. As shown in FIG. 1, the relay device 20 includes a communication network function unit 21 and a charge information generation unit 22. In FIG. 1, the charge information generation unit 22 in the relay device 20*b* near the incoming terminal 10*b* is not needed for explanation, so it is not shown on the drawing.

The communication network function unit 21 is a part that undertakes transmitting and receiving call out signals and other functions of the communication network 2 necessary for communication of the communication terminals 10. The charge information generation unit 22 is charge information generation means for generating charging information in connection with transmission of display information. The charge information generation unit 22 detects that transmission notifications transmitted from incoming communication terminals 10 that have received display information as described above have been transmitted to the outgoing communication terminal 10. When the communication network function unit 21 has transmitted a transmission notification, the charge information generation means 22 receives a notification of this fact from the communication network function unit 21. Also, at this time in addition the charge information generation unit 22 acquires from the communication network function unit 21 information that is necessary for generating charging information (information for identifying the outgoing terminal 10a, information on the amount of data that is subject to charge, and so on). The charge information generation unit 22 then generates charging information for the outgoing terminal 10a corresponding to the amount of data.

Figure 2:
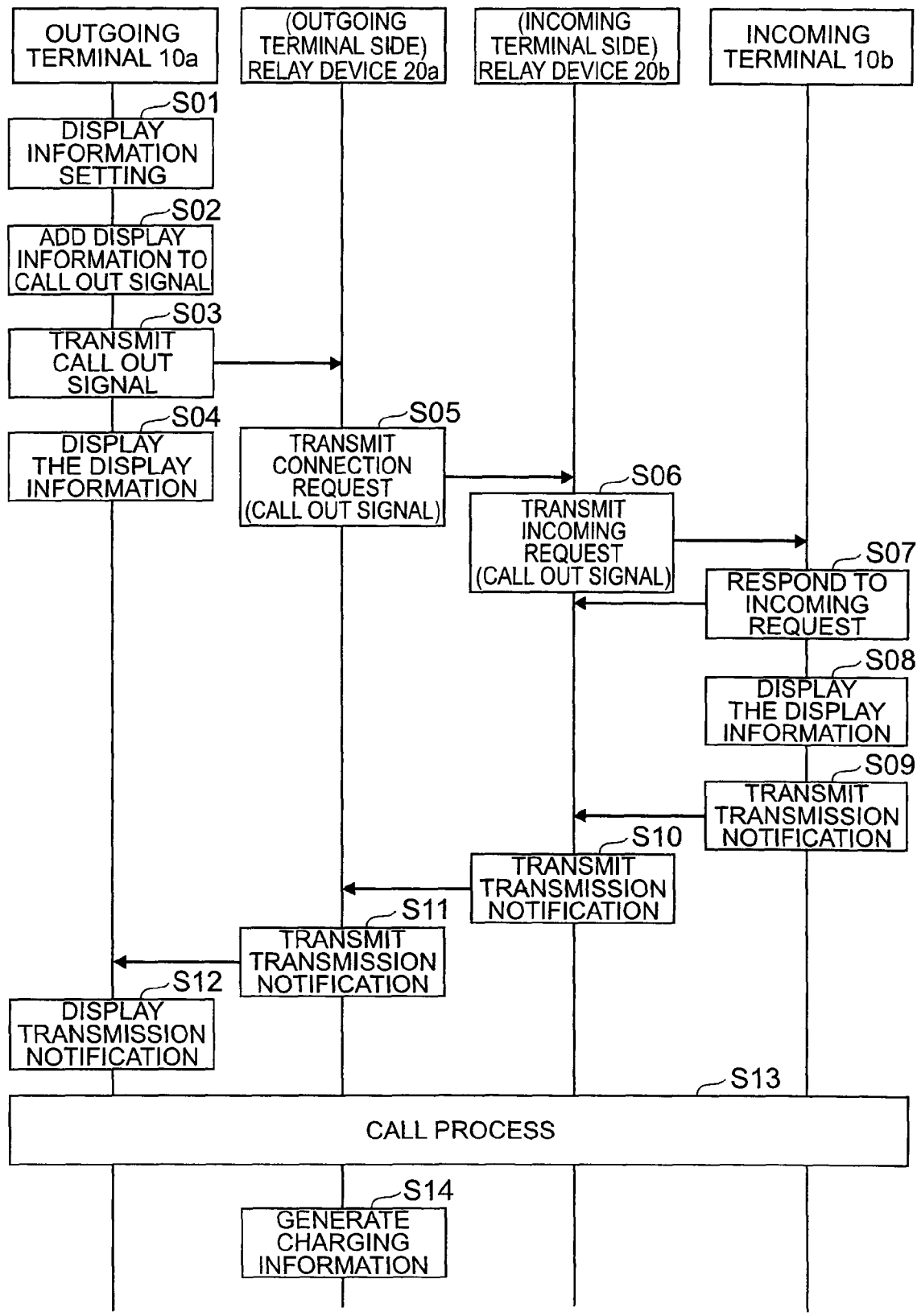
FIG. 2 is a sequence diagram showing a process (control method) implemented in the communication terminal and communication system according to an embodiment of the present invention.

Next, a process (control method) implemented in the communication terminal 10 and communication system 1 according to the present embodiment is explained, using the sequence diagram in FIG. 2. This process is the process that is carried out when the outgoing terminal 10a including a message (display information) when calling out to the incoming terminal 10b. It is assumed that input by the user for setting the display information and so on, specifying the call out destination which is the incoming terminal 10b, and the operation of calling out have already been completed.

First, in the outgoing terminal 10a, the transmitted information setting and adding unit 13 carries out setting of display information (S01). This setting is carried out by, for example, receiving the input and selections of the user as described above. Specifically, text data such as "This is Hasegawa from xx Co., Ltd." for example is set as display information. Next, the transmitted information setting and adding unit 13 adds the set display information to the call out signal (S02, adding step). Next, in the outgoing terminal 10a, the call connection establishment unit 12 transmits a call up signal addressed for the incoming terminal 10b to the communication network 2 (the relay device 20a near the outgoing terminal 10a) (S03, transmission step). This transmission is carried out via base stations (not shown on the drawings) or similar that are included in the communication network 2.

Figure 3:
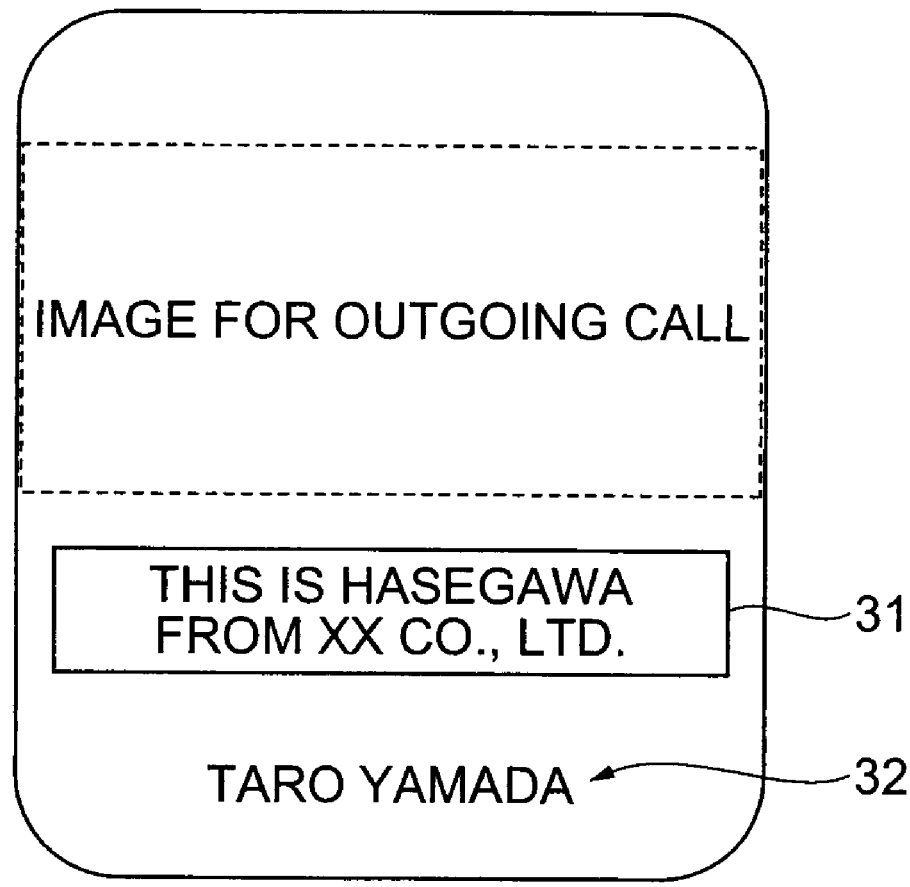
FIG. 3 is a diagram showing the display on the display device of the outgoing terminal when calling out.

When the call out signal is transmitted, in the outgoing terminal 10a the display control unit 14 displays on the display device 11 the display information added to the call out signal. The display device 11 is controlled by the display control unit 14 to display the display information (S04, display control step). FIG. 3 shows an example of the display on the display device 11 of the outgoing terminal 10a at this time. As shown in FIG. 3, the text data that is the display information is displayed in a predetermined area 31 of the display portion of the display device 11. Also, as shown in FIG. 3, a display 32 that identifies the user of the incoming terminal 10b may also be displayed together with this display. The user of the outgoing terminal 10a can confirm the content of the display displayed in the incoming terminal 10b when calling, by referring to the display information displayed.

When the call out signal is transmitted, in the relay device 20a the communication network function unit 21 receives the call out signal. The communication network function unit 21 looks up the information or similar indicating the telephone number of the incoming terminal 10b included in the call out signal, identifies the relay device 20b that is to be connected to, and transmits a connection request to the relay device 20b, based on the call out signal (S05). At this time the display information included in the call out signal is also transmitted.

Next, at the relay device 20b, the communication network function unit 21 receives the connection request from the relay device 20a. The communication network function unit 21 looks up the information or similar indicating the telephone number of the incoming terminal 10b included in the call out signal, identifies the incoming terminal 10b to which an incoming request is to be sent, and transmits an incoming request to the incoming terminal 10b (S06). This incoming request is transmitted as an incoming request from the outgoing terminal 10a. At this time the display information included in the call out signal is also transmitted. Also, this transmission is carried out via base stations (not shown in the drawings) included in the communication network 2.

When the incoming request is transmitted, at the incoming terminal 10b, the call connection establishment unit 12 receives the incoming request. Next, the call connection establishment unit 12 sends a response in respect of the incoming request to the relay device 20b (S07), and the call process is carried out with respect to the incoming terminal 10b.

Figure 4:
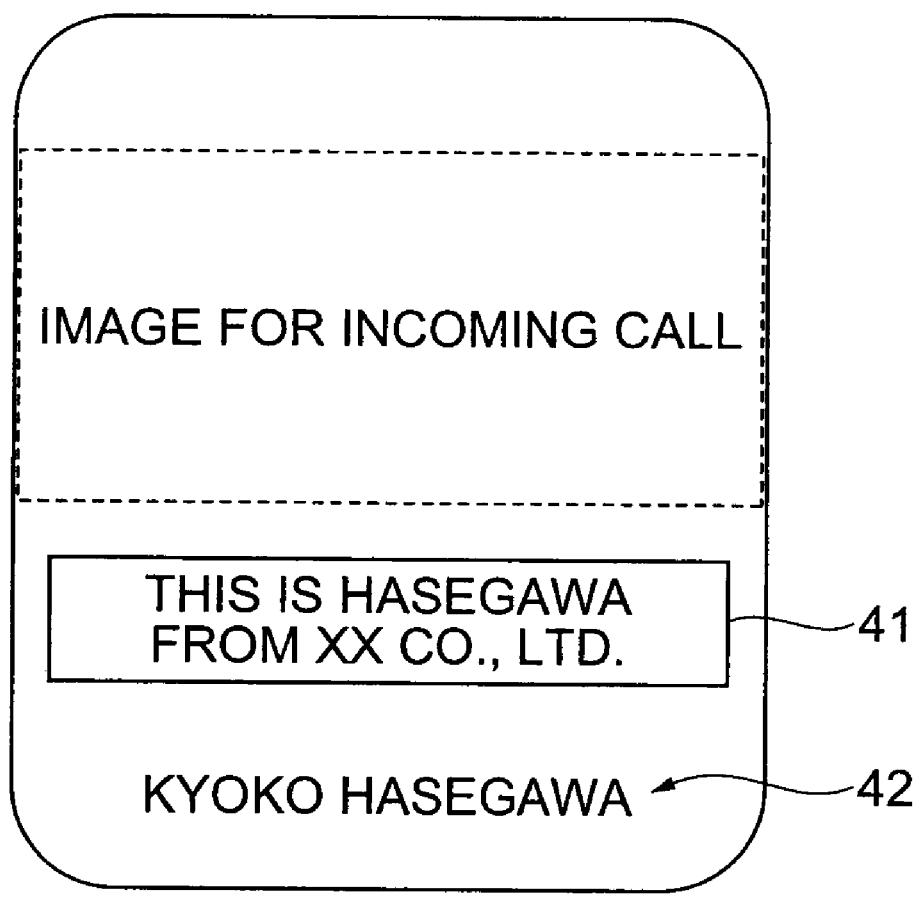
FIG. 4 is a diagram showing the display on the display device of the incoming terminal when the outgoing terminal is calling out.

Next, in the incoming terminal 10b, the display control unit 14 receives the display information included in the incoming request from the call connection establishment unit 12, and displays the display information on the display device 11. The display device 11 is controlled by the display control unit 14 to display the display information (S08). This display is displayed while the call process is being carried out. FIG. 4 shows an example of the display on the display device 11 of the incoming terminal 10b at this time. As shown in FIG. 4, the text data that is the display information is displayed in a predetermined area 41 of the display portion of the display device 11. Also, as shown in FIG. 4, a display 42 that identifies the user of the outgoing terminal 10a may also be displayed together with this display. The user of the incoming terminal 10b can confirm the call out message of the user of the outgoing terminal 10a, by referring to the display information displayed. If the call is answered, normally the incoming history is recorded in the incoming terminal 10b, but the display information is not necessarily recorded in the incoming history.

Next, in the incoming terminal 10b, the call connection establishment unit 12 transmits a transmission notification addressed to the outgoing terminal 10a, indicating that the display information has been received, to the communication network 2 (the relay device 20b near the incoming terminal 10b) (S09).

In the present embodiment, the incoming terminal 10b can receive display information, but if the incoming terminal 10b cannot receive display information, the transmission notification is not sent. Cases where display information cannot be received include the case when the incoming terminal 10b does not have the function of displaying display information added to the call out signal. Also, there is the case where the incoming terminal 10b is not set to display the display information added to the call out signal. Also, there is the case where the incoming request itself based on the call out signal cannot be received, because the incoming terminal 10b is outside the reception area.

When the transmission notification is transmitted by the incoming terminal 10b, in the relay device 20b the communication network function unit 21 receives the transmission notification, and transmits the transmission notification to the relay device 20a (S10). In the relay device 20a the communication network function unit 21 receives the transmission notification, and transmits the transmission notification to the outgoing terminal 10a (S11).

In the incoming terminal 10a, the call connection establishment unit 12 receives the transmission notification. When the transmission notification is received, in the outgoing terminal 10a, the display control unit 14 terminates the display of the display information on the display device 11, and displays a display corresponding to the transmission notification (S12, receiving step, display control step). The display corresponding to the transmission notification is a display indicating that the display information has been displayed in the incoming terminal 10b. The user of the outgoing terminal 10a can refer to the display, and reliably confirm that the display information has been displayed in the incoming terminal 10b.

Also, in the outgoing terminal 10a, if the transmission notification has not been received within a predetermined period of time after transmission of the call out signal, it is determined that the display information has not been transmitted to the incoming terminal 10b. In this case, in the outgoing terminal 10a, the display control unit 14 displays a message on the display device 11 that the display information has not been displayed in the incoming terminal 10b. This display may be a simple pictorial display.

When the above process is completed, a ring back tone process is carried out between the outgoing terminal 10a and the incoming terminal 10b (S13). Then the call is carried out between the outgoing terminal 10a and the incoming terminal 10b.

Then in the relay device 20a near the outgoing terminal 10a, the charge information generation unit 22 detects that a transmission notification has been transmitted to the outgoing terminal 10a, and generates the charging information for the transmission of the display information (S14, charge information generating step). The user of the outgoing terminal 10a is charged based on the generated charging information.

As stated above, in the present embodiment, in the outgoing terminal 10a, when an outgoing signal is transmitted, the display information displayed in the incoming terminal 10b is also displayed in the outgoing terminal 10a. By referring to the display, the user can confirm the message transmitted from the outgoing terminal 10a to the user of the incoming terminal 10b when calling out. In this way, according to the present embodiment, a user can confirm what message has been sent to the communication party when calling out, so it is possible to improve the convenience of the user.

Also, as stated above, if the termination of display of the display information in the outgoing terminal 10a is triggered by receipt of the transmission notification, the termination of the display of the display information can be carried out at a timing that is desirable for the use of the communication terminal 10 by the user. Also, by carrying out the display in accordance with the transmission notification, the user of the outgoing terminal 10a can confirm whether the display information has been displayed in the incoming terminal 10b. In this way, the convenience of the user can be improved.

If the communication system 1 is a third generation mobile communication system, and if the display information is included in the locking shift codeset of the call out signal, the present invention can simply and reliably be implemented in a third generation mobile communication system.

Also, if, as in the present embodiment, the charging information is generated in the relay device 20a after the transmission notification has been transmitted to the outgoing terminal 10a, the convenience of the user can be improved, and also control of charging associated with the transmission of display information is simplified. Also, the charging information is generated only when the display information is displayed in the incoming terminal 10b (charging information is not generated when the display information is not displayed). Therefore, it is possible to charge appropriately.

The embodiment as described above can also be implemented when the call and connection between the outgoing terminal 10a and the incoming terminal 10b is established through roaming. Also, the present embodiment can be implemented with videophone systems. Also, in the present embodiment the communication system was a mobile communication system 1. However, other systems may be used, for example a cable telephone system.

Also, in the present embodiment, the display information is displayed unconditionally in the incoming terminal 10b to which the display information was transmitted. However, it is possible for the display information to be not displayed, depending on the setting. In this case, incoming requests from the outgoing terminal 10a can be set to not display in accordance with whether the telephone number of the outgoing terminal 10a is displayed or not, or whether the outgoing terminal 10a associated with the incoming request is registered in the memory of the incoming terminal 10b or not.

What is claimed is:

1. A mobile communication terminal having a display device, comprising: transmission means for transmitting a call out signal for calling out to a mobile communication terminal of a communication party; adding means for adding display information, that is displayed in the mobile communication terminal of the communication party, to the call out signal transmitted by the transmission means; display control means for displaying the display information added to the call out signal by the adding means on the display device, when the call out signal is transmitted by the transmission means; and receiving means for receiving a transmission notification transmitted from the mobile communication terminal of the communication party in accordance with the call out signal transmitted by the transmission means, the transmission notification indicating that the mobile communication terminal of the communication party has received the display information added to the call out signal, charging information being generated on a transmission of the display information by a detection of a transmission of the transmission notification to the mobile communication terminal, wherein the display control means terminates a display of the display information and displays on the display device a display according to the transmission notification when the transmission notification is received from the receiving means.

2. The mobile communication terminal according to claim 1, wherein a communication system for communicating with the mobile communication terminal of the communication party is a third generation mobile communication system, and the adding means adds the display information to the call out signal by including the display information in a locking shift codeset of the call out signal.

3. A communication system that includes
a plurality of mobile communication terminals each having a display device, and
a charge information generation device that generates charging information for charging a transmission by the mobile communication terminals,
one of the plurality of mobile communication terminal terminals including
transmission means for transmitting a call out signal for calling out to a mobile communication terminal of a communication party;
adding means for adding display information, that is displayed in the mobile communication terminal of the communication party, to the call out signal transmitted by the transmission means;
display control means for displaying the display information added to the call out signal by the adding means on the display device, when the call out signal is transmitted by the transmission means;
receiving means for receiving a transmission notification transmitted from the mobile communication terminal of the communication party in accordance with the call out signal transmitted by the transmission means, the transmission notification indicating that the mobile communication terminal of the communication party has received the display information added to the call out signal, wherein the display control means terminates a display of the display information and displays on the display device of the one of the plurality of mobile communication devices a display according to the transmission notification when the transmission notification is received from the receiving means, and the charge information generation device detects the transmission of the transmission notification to the one of the plurality of mobile communication terminals, and generates the charging information on the transmission of the display information.

4. A control method for a mobile communication terminal having a display device, comprising: transmitting a call out signal for calling out to a mobile communication terminal of a communication party; adding display information that is displayed in the mobile communication terminal of the communication party to the call out signal transmitted in the transmitting; displaying on the display device the display information added to the call out signal in the adding, when the call out signal is transmitted in the transmitting; receiving a transmission notification transmitted from the mobile communication terminal of the communication party in accordance with the call out signal transmitted in the transmitting, the transmission notification indicating that the mobile communication terminal of the communication party has received the display information added to the call out signal, charging information being generated on a transmission of the display information by a detection of a transmission of the transmission notification to the mobile communication terminal; and terminating a display of the display information and displaying on the display device a display according to the transmission notification when the transmission notification is received in the receiving.

5. A control method in a communication system that includes a plurality of mobile communication terminals each having a display device, and a charge information generation device that generates charging information for charging a transmission by the mobile communication terminals, wherein the mobile communication terminals carry out the method comprising:

transmitting a call out signal for calling out to a mobile communication terminal of a communication party;

adding display information that is displayed in the mobile communication terminal of the communication party to the call out signal transmitted in the transmitting;

displaying on the display device the display information added to the call out signal in the adding, when the call out signal is transmitted in the transmitting;

receiving a transmission notification transmitted from the mobile communication terminal of the communication party in accordance with the call out signal transmitted in the transmitting, the transmission notification indicating that the mobile communication terminal of the communication party has received the display information added to the call out signal; and terminating a display of the display information and displaying on the display device a display according to the transmission notification when the transmission notification is received in the receiving, and the charging information generation device carries out the method comprising:

generating the charging information on the transmission of the display information by detecting the transmission of the transmission notification to one of the mobile communication terminals that carried out the method.

6. A mobile communication terminal having a display device, comprising: a transmission unit configured to transmit a call out signal for calling out to a mobile communication terminal of a communication party; an adding unit configured to add display information, that is displayed in the mobile communication terminal of the communication party, to the call out signal transmitted by the transmission unit; a display unit configured to display the display information added to the call out signal by the adding unit on the display device, when the call out signal is transmitted by the transmission unit; and a call connection establishment unit configured to receive a transmission notification transmitted from the mobile communication terminal of the communication party in accordance with the call out signal transmitted by the transmission unit, the transmission notification indicating that the mobile communication terminal of the communication party has received the display information added to the call out signal, charging information being generated on a transmission of the display information by a detection of a transmission of the transmission notification to the mobile communication terminal, wherein the display unit is further configured to terminate a display of the display information and displays on the display device a display according to the transmission notification when the transmission notification is received from the call connection establishment unit.

* * * * *